(12) United States Patent
Stewart

(10) Patent No.: US 8,135,768 B2
(45) Date of Patent: Mar. 13, 2012

(54) ADDER WITH REDUCED CAPACITANCE

(75) Inventor: Malcolm Stewart, Ottawa (CA)

(73) Assignee: Mtekvision Co., Ltd., Seoul (KR)

( * ) Notice: Subject to any disclaimer, the term of this patent is extended or adjusted under 35 U.S.C. 154(b) by 1288 days.

(21) Appl. No.: 11/364,915

(22) Filed: Mar. 1, 2006

(65) Prior Publication Data

US 2006/0235924 A1    Oct. 19, 2006

Related U.S. Application Data

(60) Provisional application No. 60/657,391, filed on Mar. 2, 2005.

(51) Int. Cl.
*G06F 7/50* (2006.01)

(52) U.S. Cl. ...................................... 708/702

(58) Field of Classification Search ........... 708/700–714
See application file for complete search history.

(56) References Cited

U.S. PATENT DOCUMENTS

| | | | | |
|---|---|---|---|---|
| 4,471,455 A | * | 9/1984 | Dshkhunian et al. | 708/703 |
| 4,532,479 A | * | 7/1985 | Blauschild | 330/261 |
| 4,601,007 A | * | 7/1986 | Uya et al. | 708/702 |
| 4,766,565 A | * | 8/1988 | Bechade et al. | 708/702 |
| 4,789,958 A | * | 12/1988 | Maejima et al. | 708/710 |
| 4,866,658 A | * | 9/1989 | Mazin et al. | 708/702 |
| 4,870,609 A | * | 9/1989 | Yasui et al. | 708/702 |
| 5,146,424 A | * | 9/1992 | Peterson et al. | 708/711 |
| 5,491,653 A | * | 2/1996 | Taborn et al. | 708/708 |
| 5,596,520 A | * | 1/1997 | Hara et al. | 708/707 |
| 5,875,124 A | * | 2/1999 | Takahashi | 708/702 |

* cited by examiner

*Primary Examiner* — Lewis A Bullock, Jr.
*Assistant Examiner* — Kevin G Hughes
(74) *Attorney, Agent, or Firm* — Birch, Stewart, Kolasch & Birch, LLP

(57) ABSTRACT

An electronic circuit for performing logic operations is provided. The electronic circuit comprises a logic gate having at least two binary inputs adapted to receive corresponding input binary digits; an output for outputting an output signal; signal transmission means between said input and said output; a logic circuit coupled to said transmission means and having an input capacitance, and capacitance decoupling means between said logic circuit and said transmission means for decoupling the input capacitance of said logic circuit from said transmission means.

35 Claims, 8 Drawing Sheets

ADDER WITH REDUCED CAPACITANCE

CROSS REFERENCE TO RELATED APPLICATION

This application claims the benefit of U.S. provisional application Ser. No. 60/657,391, filed Mar. 2, 2005 the disclosure of which is incorporated herein by reference.

BACKGROUND OF THE INVENTION

The present invention relates to electronic circuits, and in particular to electronic circuits for performing logic operations.

Logic circuits have a wide variety of uses and may be configured to perform arithmetical operations. A basic full adder circuit can be described by the following two equations:

$$\text{Sum} = A \oplus B \oplus C_{in} \quad \text{(Eq. 1)}$$

$$C_{out} = AB + BC_{in} + AC_{in} \quad \text{(Eq. 2)}$$

A full adder cell or block can be illustrated in the form shown in FIG. 1. The full adder cell 1 has first and second inputs 3, 5 for receiving the numbers (A, B) to be summed, a carry input 7, a carry output 9 and a sum output 11. Typically each input and output is a single bit. In order to perform higher order addition, a number of full adders are connected together in a series with the carry output of one adder being connected to the carry input of another adder. An example of a four-bit adder circuit is shown in FIG. 2 and comprises four full adder cells 2, 4, 6 and 8. The main concerns in designing a full adder circuit are the speed and area of the circuit. In the four-bit full adder shown in FIG. 2, the maximum propagation delay can be described by:

$$\text{4bit\_delay} = t_H + 4 \times t_{carry} + t_{Sum} \quad \text{(Eq. 3)}$$

where $t_H$ describes the delay through the circuit that implements (Eq. 4) logic:

$$H = \overline{A}B + A\overline{B} = A \oplus B \quad \text{(Eq. 4)}$$

Using (Eq.4), (Eq.1) and (Eq.2) are rewritten as:

$$\text{Sum} = H \oplus C_{in} \quad \text{(Eq. 5)}$$

$$C_{out} = \overline{H}A + HC_{in} \quad \text{(Eq. 6)}$$

$t_{carry}$ describes the delay from $C_{in}$ to $C_{out}$ of a full adder cell, and $t_{Sum}$ describes the delay through the circuit that implements Eq. 5. The reason that the H-equation logic is added is to minimize the number of input lines that effect the propagation of $C_{in}$ to $C_{out}$.

FIG. 3 shows a typical standard cell implementation of a full adder which implements equations 4, 5 and 6. The adder circuit comprises a first (or input) XOR gate 15 for determining the value of H (equation 3), an inverter 17 at the output of the XOR gate 15 for deriving the value $\overline{H}$ for use in equation 6, a first transmission gate 19, a carry propagate circuit 21 (transmission means) between the carry input and carry output 7, 9, and a summing circuit 31 comprising a second XOR gate for implementing equation 5. The carry propagate circuit 21 comprises a second transmission gate 23 and a buffer 25 comprising a pair of serially arranged inverters 27, 29.

The first input 20 of the first transmission gate 19 is connected to the first input 3 of the adder circuit and the other complementary inputs 22, 24 (NMOS gate and PMOS gate) are connected to receive the values $\overline{H}$ and H respectively. The output 26 of the first transmission gate 19 is connected to the carry propagate circuit 21 and implements the first term of equation 6. The first input 28 of the second transmission gate 23 is connected to the C input 7 of the carry propagate circuit and the complementary inputs 30, 32 are connected to receive the values of H and $\overline{H}$, respectively. The output 34 of the second transmission gate outputs the value $HC_{IN}$ which is the second term of equation 6.

One of the inputs 36 of the second (or summing) XOR gate 31 is connected to the output of the first XOR gate 15 for receiving the value H and the second input 38 of the second XOR gate is connected to the input 7 of the carry propagate circuit 21 for receiving the value $C_{IN}$.

The components of the full adder circuit shown in FIG. 3 that are responsible for the propagation delay of equation 3 are as follows. $t_H$ is the delay through the input XOR gate 15, $t_{SUM}$ is the delay through the output XOR gate 31, and $t_{CARRY}$ is the delay from $C_{IN}$ to $C_{OUT}$ (for bit 0 this might be from the first input 3 (A) to $C_{OUT}$). It is apparent from equation 3 that the propagation delay from $C_{IN}$ to $C_{OUT}$ in a multiple cell adder is more heavily weighted than other parts of the equation, and this delay plays a pivotal role in determining the total delay through the adder chain.

In a typical standard cell implementation, when H=1, the $C_{IN}$ signal is loaded by the gate capacitance of the second XOR gate 31, which is equal to, at the very least, the input capacitance of an inverter comprising an N-type and P-type gate capacitance; the N-type and P-type gate capacitance of the second transmission gate 23, the two drain to gate capacitances of the first transmission gate 19 and the input capacitance of the buffer cell 25. In addition, there is a propagation delay through the output buffer cell, which comprises two inverters 27, 29 in series.

It would be desirable to reduce the propagation delay in the carry propagate circuit.

SUMMARY OF THE INVENTION

The present invention in one embodiment involves the provision of an electronic circuit comprising: a logic gate having at least two binary inputs adapted to receive corresponding input binary digits; an output for outputting an output signal; signal transmission means between said input and said output; a logic circuit coupled to said transmission means and having an input capacitance, and capacitance decoupling means between said logic circuit and said transmission means for decoupling the input capacitance of said logic circuit from said transmission means.

According to another aspect of the present invention, there is provided an electronic circuit comprising first and second signal generating means, each having an input and an output, circuit means between the output of said first signal generating means and the input of said second signal generating means, and a circuit, for example a logic circuit coupled to the input of said first signal generating means.

According to yet another aspect of the present invention, there is provided an electronic circuit comprising first and second inputs and first and second outputs, first transmission means between said first input and said first output and second transmission means between said second input and said second output, a circuit having first and second inputs, wherein the first input is coupled to the first transmission means and the second input is coupled to the second transmission means.

According to a further aspect of the present invention, there is provided an electronic circuit comprising first and second transmission means having a respective input and a respective output and a differential buffer having a first input coupled to the output of said first transmission means and a second input coupled to the output of said second transmission means.

According to yet a further aspect of the present invention, there is provided an adder circuit comprising first and second inputs for receiving signals to be added together, circuit means for determining the sum of said signals and first and second carry propagate circuits each having an input and an output, and wherein said first carry propagate circuit is adapted to determine a carry-out signal from a carry-in signal and the second carry propagate circuit is adapted to determine a carry-out signal from an inverted carry-in signal.

According to yet a further aspect of the present invention, there is provided an electronic circuit comprising an input circuit having at least one input for receiving a signal, a transmission means having an input and output, the input circuit being connected to said transmission means, a further circuit coupled to the transmission means, and capacitive reduction or decoupling means connected between said transmission means and said further circuit means for reducing the capacitive load on the input of said transmission means.

BRIEF DESCRIPTION OF DRAWINGS

Examples of embodiments of the present invention will now be described with reference to the drawings, in which.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein. Like numbers utilized throughout the various Figures designate like or similar parts.

DETAILED DESCRIPTION

Before describing the present invention, it will be understood that variations of the present invention may is not limited to the specific examples described herein.

Figure 4:
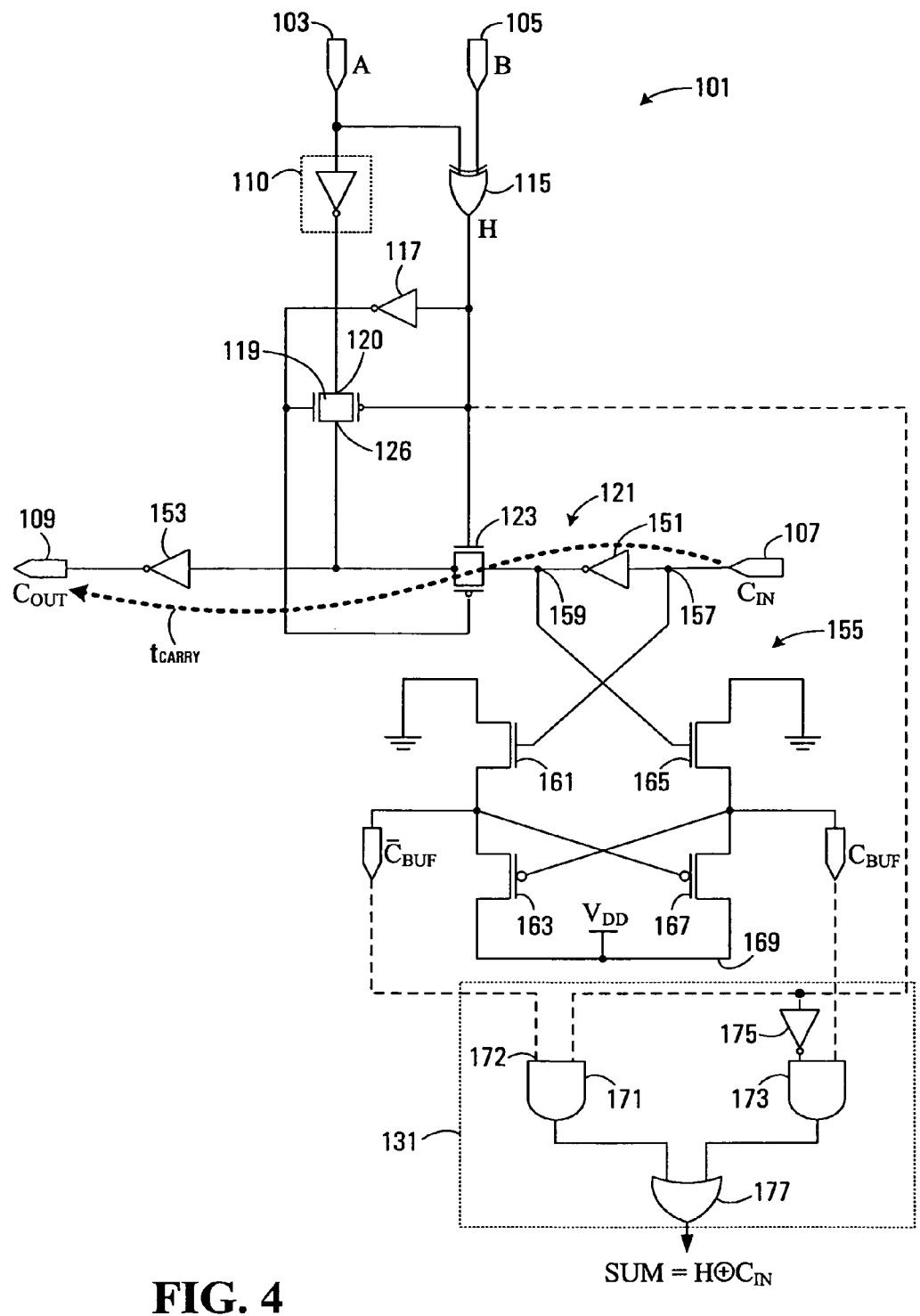
FIG. 4 shows an example of a full adder circuit according to an embodiment of the present invention.

FIG. 4 shows an example of a full adder circuit according to a first embodiment of the present invention.

The circuit 101 comprises first and second inputs 103, 105 for receiving bits to be summed and each being connected to the respective inputs of an input XOR gate 115 for generating a value "H". The first inverter 117 is connected to the output of the input XOR gate 115 for generating a value $\overline{H}$, and the values $\overline{H}$ and H are applied to the complementary inputs of a first transmission gate 119. The other input terminal 120 of the first transmission gate 119 is arranged to receive the inverse of the signal received at the first input 103. Although $\overline{A}$ may be generated by a separate inverter 110, the value $\overline{A}$ is also generated by the XOR gate 115 and therefore a separate inverter is not required.

The adder 101 has a carry propagate circuit 121 having an input 107 for receiving a carry bit, $C_{IN}$, and an output 109 for outputting a carry bit, $C_{OUT}$. The propagate circuit 121 comprises a first inverter 151, a transmission gate 123 and a second inverter 153. The output 126 of the first transmission gate 119 is connected to the carry propagate circuit between the transmission gate 123 and the second inverter 153.

The adder 101 includes a second XOR gate 131 for generating a sum from the values of H and $C_{IN}$ (equation 5) and a buffer circuit 155 connected between the carry propagate circuit 121 and the summing XOR gate 131.

The buffer circuit 155 has a first input 157 connected to the input of the first inverter 151 and a second input 159 connected to the output of the first inverter. The buffer circuit 155 comprises first and second FET's 161, 163 and third and a fourth FET's 165, 167. The first and third FET's 161, 165 are both NMOS-type FETS whereas the second and fourth FET's 163, 167 are both PMOS-type FETS. The sources of the first and third FET's are connected to ground and their drains are connected to the sources of the second and fourth FET's, respectively. The drains of the second and fourth FET's are connected to a voltage rail 169. The gate of the first FET 161 is connected to the input of the first inverter 151 of the carry propagate circuit and the gate of the third FET 165 is connected to the output of the first inverter 151. The gate of the second FET 163 is cross-coupled to the drain of the second FET 165 and the gate of the fourth FET 167 is cross-coupled to the drain of the first FET 161. The drains of the first and third FET's 161, 165 provide inverted and non-inverted buffered carry-in signals $\overline{C_{BUF}}$ and $C_{BUF}$, respectively and are used as inputs to the XOR gate 131, which will be described in more detail below.

A typical XOR gate comprises a pair of AND gates each having an inverter on one of their inputs and an OR gate connected to their outputs. As an inverter and the input to an AND gate typically comprise two FET's each when implemented in CMOS, each input to an XOR gate is effectively coupled to four gate capacitances.

The purpose of the buffer circuit 155 is to effectively reduce the capacitance at the input of the carry propagate circuit. The buffer circuit effectively decouples the input capacitance of the summing circuit 131 from the input 107 of the carry propagate circuit.

In the embodiment shown in FIG. 4, the input capacitance of the carry propagate circuit essentially corresponds to the gate capacitance of the first NMOS FET 161 and the two-gate capacitances of the FET's of the first inverter 151. This is a substantial reduction in the input capacitance of the circuit shown in FIG. 3. It is to be noted that the gate capacitance of the first FET 161 can be reduced by using a relatively small FET. Also, as the FET can be implemented in NMOS, the gate capacitance can be significantly reduced over a PMOS FET, in which the gate area (and therefore capacitance) is typically 3 times larger. The "input" capacitance of the carry propagate circuit at the output of the first inverter 151 is provided by the gate capacitance of the third NMOS FET 165 of the buffer circuit, the gate capacitances of the NMOS and PMOS FET's of the transmission gate 123, the gate to drain capacitances of the transmission gate 119 and the input capacitance of the second inverter 153.

Partially coupling the summing XOR circuit 131 at the input of the first inverter 151 causes the capacitive loading of the carry propagate circuit to be shared more evenly between the inverters, each of which drives an inverted input signal from its output. The presence of two inverters ensures that the parity of the carry propagate signal is maintained between the input and output of the carry propagate circuit 121.

The differential buffer circuit 155 operates as follows. When the input of the carry propagate circuit is high (i.e. 1), the gate of the first FET 161 is high connecting the drain of the first FET to ground, and generating $\overline{C}_{BUFF}$. At the same time, the output of the first inverter and therefore the gate of the third FET 165 is low, turning the third FET off. The gate of the fourth FET 167 (PMOS) is pulled low, turning on the FET and connecting its source to the voltage rail 169 so that $C_{BUF}$ is high. This signal drives the gate of the second FET 163 (PMOS) high, thereby turning the second FET 163 off, to ensure that its source is pulled low by the first FET 161. In this way, the differential buffer circuit 155 generates inverted and non-inverted signals in which the voltage of the high signal corresponds to the voltage on the voltage rail 169 and the low signal essentially corresponds to ground.

When the carry input signal is low (i.e. 0), the first FET 161 is switched off, the third FET 165 is switched on, thereby connecting the gate of the second FET 163 to ground, and turning on the second FET 163, so that $\overline{C}_{BUF}$ is high (i.e. 1) and is equal to the voltage of the voltage rail 169. This signal drives the gate of the fourth FET 167 low turning off the fourth FET 167, so that $C_{BUF}$ is low (i.e. 0) and corresponds to ground.

In this embodiment, the XOR gate 131 comprises first and second AND gates 171, 173, an inverter 175 at the input of the second AND gate 173 and an OR gate 177 to which the outputs of the AND gates are connected. Although a conventional XOR gate would normally have an inverter at the first input 172 of the first AND gate 171, the differential buffer circuit 155 allows this inverter to be omitted as the circuit provides the inverted carry-in signal $C_{BUF}$. It is to be noted that $\overline{H}$ is also available at the output of the inverter 117 connected to the output of the input XOR gate 115, and this signal could be provided at the input of the second AND gate 173, allowing inverter 175 to be eliminated.

The presence of the first inverter 151 in the propagate carry circuit changes the polarity of the carry input signal which is available to the succeeding portion of the circuit (including the transmission gate 123) which determines $C_{OUT}$ using equation 6. As the polarity of this signal is reversed by the second inverter 153, the carry signal at the input of the second inverter 153 is given by the equation: $\overline{C}=\overline{C}_{IN}H+\overline{AH}$ and $C_{OUT}$ at the output of the second inverter is given by the equation: $C_{OUT}=\overline{\overline{CH}+\overline{AH}}$. Therefore, the value H and $\overline{C}$ are applied to the transmission gate 123 and $\overline{AH}$ are applied to the first transmission gate 119 to generate $\overline{C}$ at the input of the second inverter 153, and the second inverter then generates $C_{OUT}$.

Figure 1:
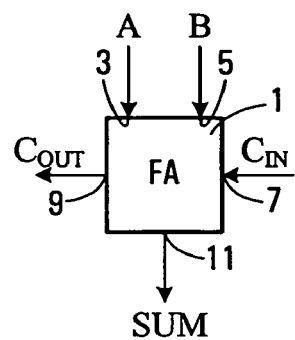
FIG. 1 shows a schematic block diagram of a full adder circuit.
Figure 2:
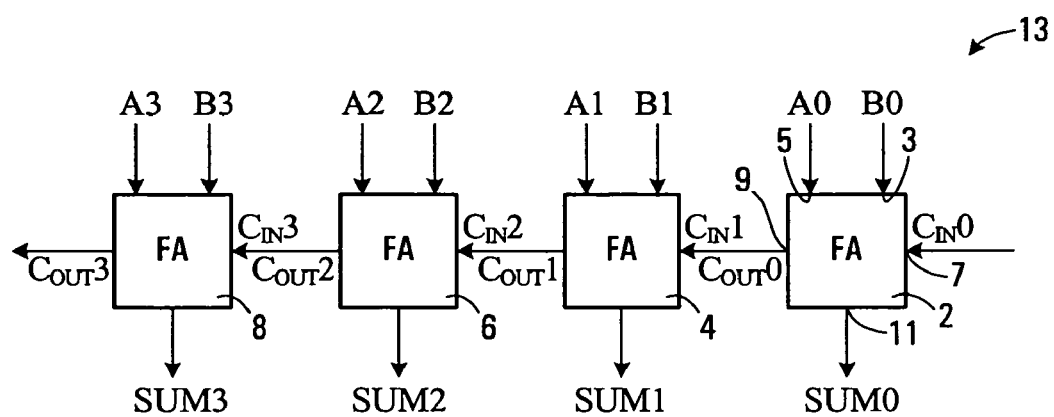
FIG. 2 shows a block diagram of a full adder comprising multiple cells.
Figure 3:
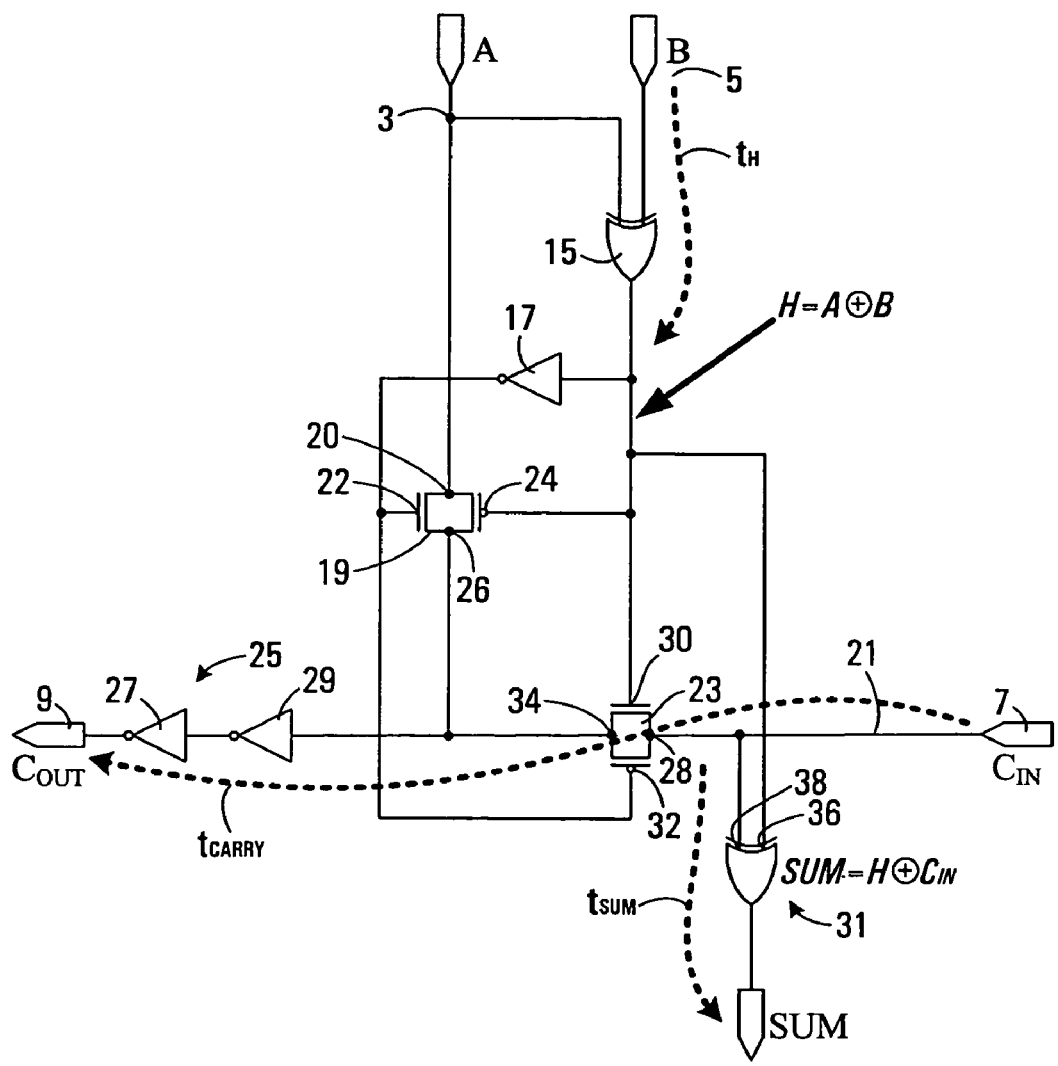
FIG. 3 shows an example of a full adder circuit.

Thus, in comparison to the circuit of FIG. 3, in the embodiment of FIG. 4, an inverter replaces the output buffer and a second inverter is placed at the input to maintain signal polarity. To decrease the amount of load on the $C_{IN}$ to $C_{OUT}$ signal path the differential buffer cell 155 is inserted between the carry input 107 and the sum XOR gate 131. This differential buffer 155 connects to the input $C_{IN}$ using the gate input of a minimum size NMOS gate, and attaches to the inverted version of $C_{IN}$ using a similar minimum size NMOS gate.

By using the differential buffer, the overall capacitance on the carry line can be reduced, and the load per inverter in the chain can be shared more evenly. By reducing the load on $C_{IN}$ and sharing the load more evenly, a higher propagation speed can be achieved.

As mentioned above, although FIG. 4 shows an inverter 110 to generate $\overline{A}$, the inverter is not in practice required as $\overline{A}$ is generated within the XOR gate that generates H. The differential buffer 155 creates both $\overline{C}_{BUF}$ and $C_{BUFF}$, which means that an inverter (or two) can be removed from the sum XOR gate. The cost of this new implementation over the standard circuit is at most two transistors for an unbuffered (slower—more load on $C_{IN}$)-adder.

Figure 5:
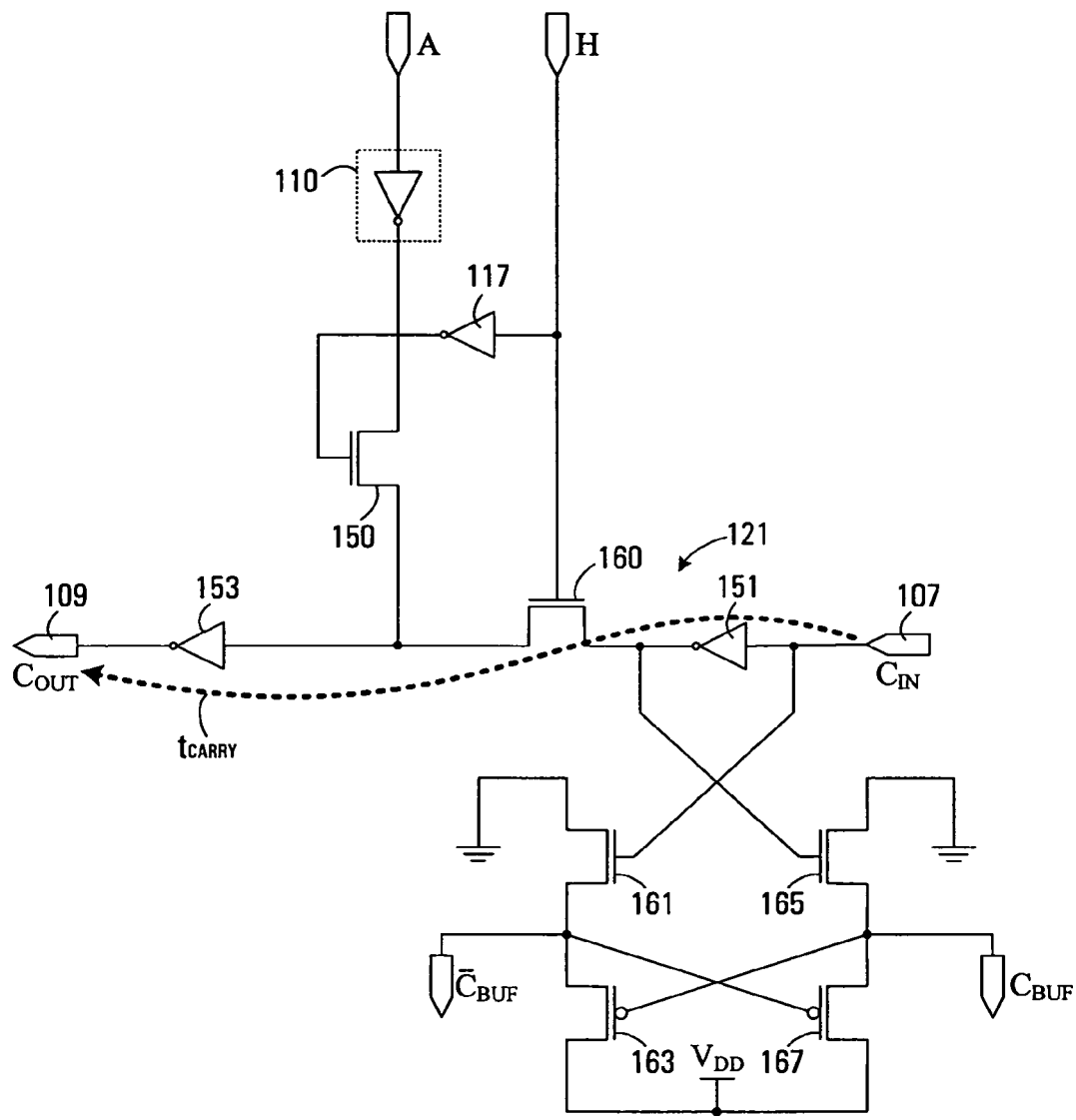
FIG. 5 shows an example of a full adder circuit according to another embodiment of the present invention.

The embodiment of FIG. 4 is suitable for voltage scaling applications because all nodes including the transmission gates realize the full voltage swing. If voltage scaling is not important to the application, or if the application supports multiple on-chip voltage levels so that this circuit can be kept in a range where it works efficiently, then one or more of the transmission gates may be replaced by a pass transistor, for example an NMOS pass transistor. An example of this implementation is shown in FIG. 5. The embodiment of FIG. 5 is similar to that shown in FIG. 4 and like parts are designated by the same reference numerals (However, the XOR gates have been omitted for simplicity, although they would, of course, be present in the actual implementation). The main difference between the circuit of FIG. 5 and that of FIG. 4 is that in FIG. 5, the transmission gates 119, 123 have been replaced by pass gates 150, 160. Replacing the transmission gate 123 in the carry propagate circuit 121 with a pass gate reduces the delay through the circuit by removing a PMOS drain-source (DS) capacitance, and a PMOS gate capacitance associated with the PMOS FET of the transmission gate. At the input of the second inverter 153, the voltage level will be reduced to $V_{DD}$-$V_{THN}$. This will only be an issue if the voltage rail is too low and the input voltage to the inverter does not reach a high enough level to cause it to switch. As long as a sufficient voltage margin is maintained, this circuit should operate quickly and efficiently. In a variation of the embodiment of FIG. 5, either one of the first and second pass gates 150, 160 can be replaced by a transmission gate.

In another embodiment of the propagate circuit, the carry-out output inverter (e.g. inverter 153) can be omitted thereby removing the propagation delay caused by the output inverter and further increasing the speed of propagation through the circuit. In this implementation, as each carry propagate circuit contains only one inverter, the polarity of the carry signal will be inverted once per circuit and therefore returned to the original polarity after propagating through two adjacent adder circuits. An example of this implementation is shown in FIG. 6.

Figure 6:
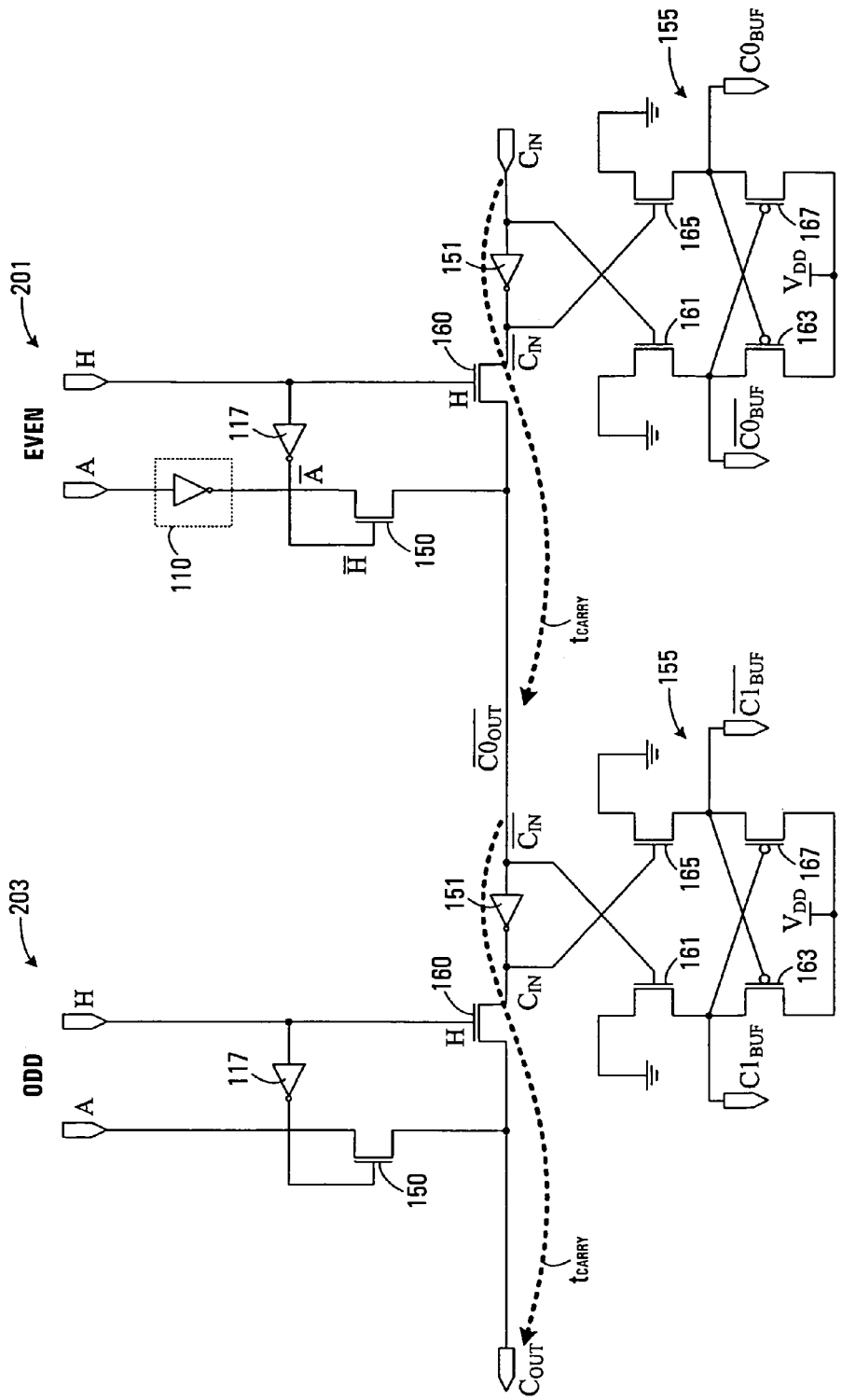
FIG. 6 shows an example of a full adder circuit according to another embodiment of the present invention.

Referring to FIG. 6, an adder circuit comprises two full adders 201, 203, (EVEN and ODD) each of which is similar to that shown in FIG. 5 and like parts are designated by the same reference numerals. The difference between the first full adder circuit 201 and that shown in FIG. 5, is that the output inverter 153 has been omitted. In this embodiment, since the carry-out ($C_{OUT}$) determining circuit of the EVEN adder 201 receives $\overline{C}_{IN}$ after the inverter 151, the input signals to the pass gate 150 are $\overline{A}$ and $\overline{H}$. Although the circuit shows the inclusion of an inverter 110 to generate $\overline{A}$, since $\overline{A}$ is available from the input XOR gate (shown in FIG. 4, not in FIG. 6), the additional inverter is not required in practice.

The input to the second full adder 203 is $\overline{C_{OUT}}$ which is subsequently inverted by the inverter 151 of the second adder 203. Therefore, the carry signal which is input to the carry-out determining circuit of the second adder 203 has the original polarity of $C_{IN}$ applied to the input of the first adder 201 and therefore the input signals to the pass gate 150 of the second circuit is A and $\overline{H}$ (rather than $\overline{A}$ and $\overline{H}$, for the first circuit).

A differential buffer cell 155 is connected across the inverter 151 of the carry propagate circuit of each full adder 201, 203 to reduce the capacitive loading at the input of the carry propagate circuit of each adder 201, 203, caused by the input capacitance of each summing XOR gate (shown in FIG. 4, not in FIG. 6). Each differential buffer circuit generates both an inverted and a non-inverted carry-in signal (i.e. $C0_{BUF}$, $\overline{C0}_{BUF}$ for the first adder and $C1_{BUF}$ and $\overline{C1}_{BUF}$ for the second adder 203) which can be applied to the inputs of the XOR gate associated with each adder.

By removing the output inverter and dividing the circuit into odd and even bits, a gate delay is saved. The actual implementation will not save the complete gate delay due to the inverter because the single inverter that remains is required to drive a modestly larger load as there is no additional inverter with which to share the load. However, the reduction in delay caused by the omission of the output inverter is significant. As an optional but preferable feature, the last full adder in the chain is arranged such that $C_{OUT}$ drives either a small load or $C_{OUT}$ is buffered.

In another embodiment of the present invention, the carry propagate circuit is split into two carry propagate lines so that the capacitive loading on each line can be further reduced. Each line may include a single inverter and the input of one line may be an inverted carry signal and the input of the other line may be a non-inverted carry signal. A differential buffer may be connected between the lines and the summing XOR gate to decouple the input of the carry propagate circuit from the capacitive loading of the XOR gate. One of the inputs to the differential buffer circuit may be connected to the input of one of the carry propagate lines and the other input of the differential buffer may be connected to the input of the other carry propagate line. The single inverter on each line may be implemented by a differential buffer circuit which can be arranged to reduce the capacitive loading on each line in comparison to a conventional double inverter-type buffer.

Figure 7:
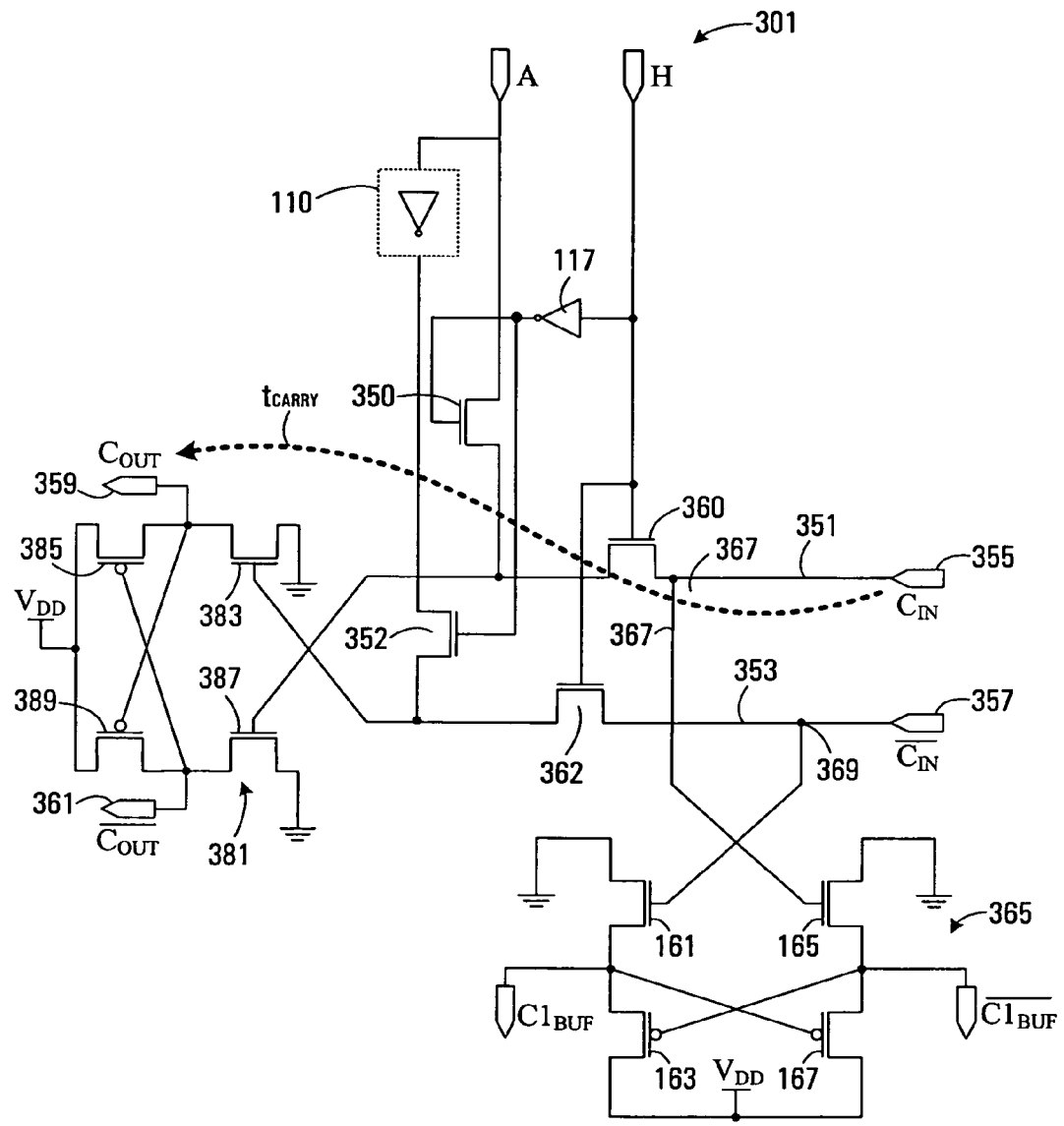
FIG. 7 shows an example of a full adder circuit according to another embodiment of the present invention.

An example of an embodiment of a carry propagate circuit having two propagate lines is shown in FIG. 7.

Referring to FIG. 7, a full adder circuit 301 comprises first and second carry propagate lines 351, 353 each having an input 355, 357 and an output 359, 361. Each line includes a circuit for determining the value of the carry-out signal. The first line 351 is connected to pass gate 350 for generating $\overline{AH}$ and also includes pass gate 360 for generating $C_{IN}H$. The second line 352 353 is connected to pass gate 352 for generating $\overline{AH}$ or $\overline{AH}$ and also includes pass gate 362 for generating $\overline{C_{IN}H}$ or $\overline{C_{IN}H}$.

A differential buffer circuit 365 is connected between the carry inputs 355, 357 and a summing XOR gate (not shown) and has a first input 367 connected to the first carry input 355 and a second input 369 connected to the second carry input 357. Advantageously, connecting a single input of the differential buffer to each carry propagate line effectively reduces the capacitive loading of the differential buffer on the carry propagate lines in comparison with the embodiment of FIG. 4, for example, since each line is connected to only one gate capacitance of an NMOS FET rather than two NMOS FET gate capacitances.

A second differential buffer circuit 381 is connected to each carry propagate line and may be connected in a manner which preserves the polarity of the carry signal in the upper and lower outputs 359, 361. The second differential buffer circuit is similar to that between the carry input lines and the summing XOR gate and fuictions in a similar manner, as described above. In particular, the differential buffer comprises first and second FET's 383, 385 in which the drain of the first FET is connected to the source of the second FET 385. The differential buffer circuit also comprises third and fourth FET's 387, 389 in which the drain of the third FET 387 is connected to the source of the fourth FET 389. The gates of the first and third FET's (which are preferably NMOS FET's) are connected to the inverse carry and non-inverted carry lines 357, 355, respectively and the gates of the second and fourth FET's (which are preferably PMOS FETS) are cross-coupled to the drains of the third and first FET's, respectively.

The reduction in capacitive loading of each carry propagate line provided by this circuit significantly increases the speed of the circuit, and the circuit exhibits good noise immunity due to its differential nature.

In an alternative embodiment, the differential buffer at the output of the circuit of FIG. 7 may be replaced by one or more inverters in each line. At least one of these inverters is preferably connected differentially, cross-coupled, between the carry propagate lines to preserve timing between the carry propagate lines and reduce the risk of a race condition between Cin and $\overline{Cin}$. However, one of the benefits of a differential buffer at the output of the propagate lines is the reduced capacitance since each line is loaded by the gate capacitance of an NMOS FET which is smaller than the input capacitance of a buffer which is typically provided by the gate capacitances of both an NMOS and PMOS FET.

In another embodiment, one or more pass gates of the embodiment of FIG. 7 may be replaced by a transmission gate.

Figure 8:
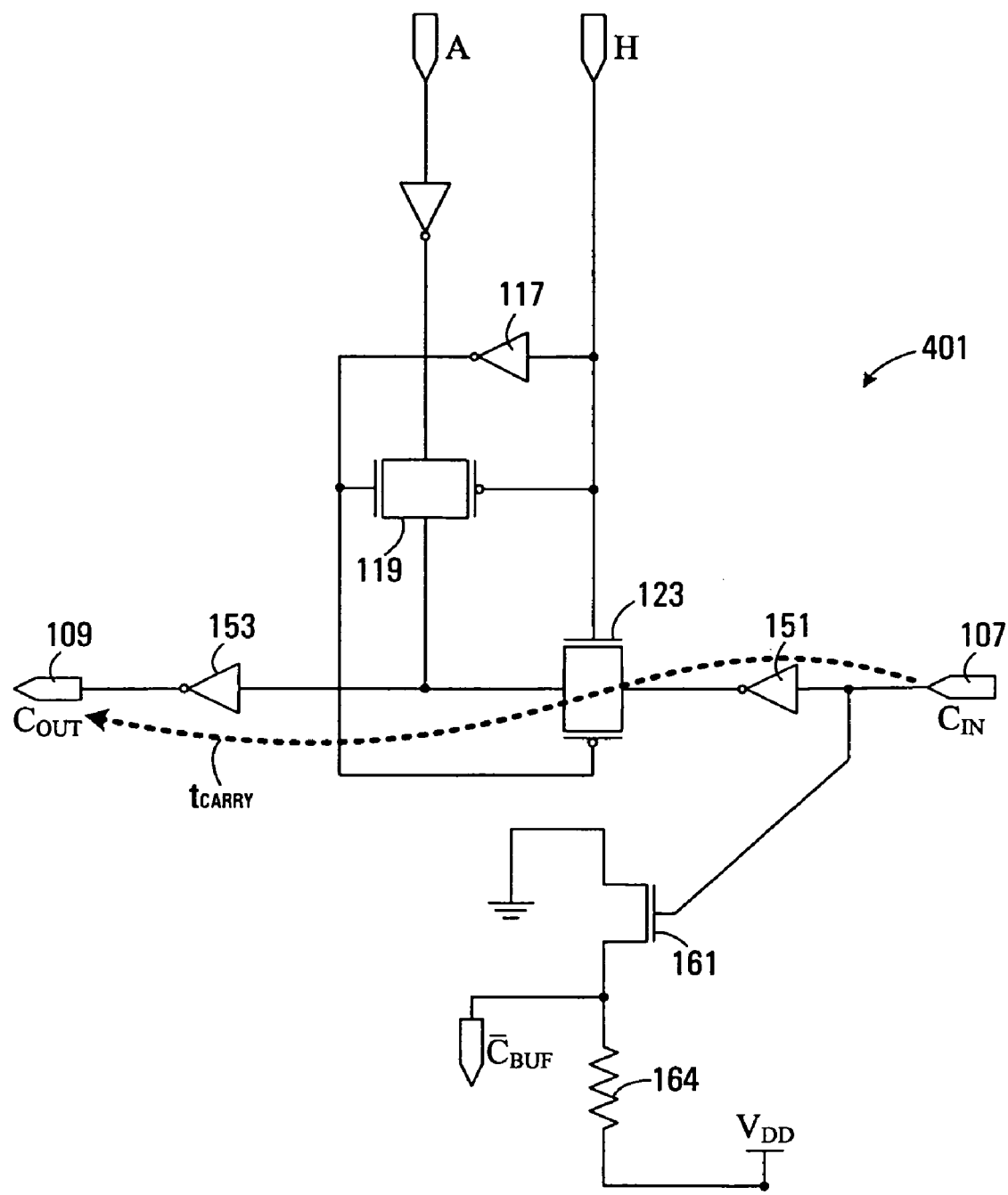
FIG. 8 shows an example of an electronic circuit according to another embodiment of the present invention.
Figure 9:
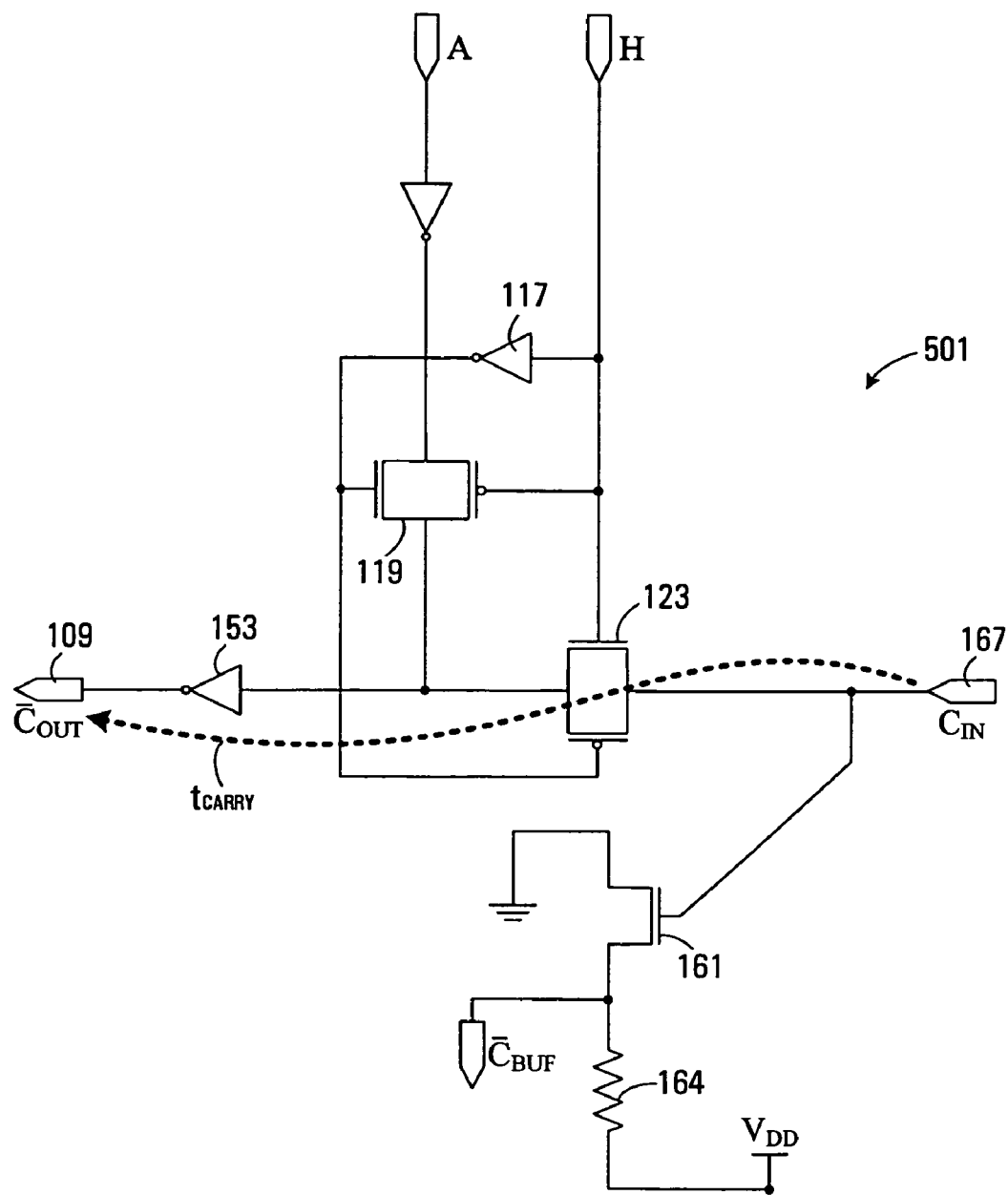
FIG. 9 shows an example of an electronic circuit according to another embodiment of the present invention.

FIGS. 8 and 9 each show another embodiment of the present invention. The embodiments of FIGS. 8 and 9 are similar to that shown in FIG. 4, and like parts are designated by the same reference numerals. The main difference between the embodiment shown in FIG. 8 and that shown in FIG. 4 is that in FIG. 8, the differential buffer connected to the input 107 of the carry propagate line has been replaced by an alternative embodiment of a capacitive reduction or decoupling means to reduce the capacitive loading on the carry propagate input resulting from the input capacitance of a logic circuit (e.g. summing XOR gate) to which it is connected. In this embodiment, the capacitive decoupling means comprises a transistor 161, for example an FET, e.g. NMOS or PMOS having a source, drain and gate, in which the gate is connected to the carry propagate input 107. The capacitive decoupling or reduction circuit further comprises a resistive load 164 coupled between the transistor 161 and the voltage rail 169. If the transistor 161 comprises an FET, either the drain or source may be connected to the resistive load 164. The other of the drain and the source of an FET implemented transistor 161 is connected to ground. In this embodiment, the capacitive decoupling circuit outputs $\overline{C_{BUF}}$ at the junction between the transistor 161 and the resistive load 164 for input to a logic circuit. In another embodiment, the control input (e.g. gate) of the transistor 161 can be connected to the output of the first inverter 151, in which case the capacitive decoupling circuit would output $C_{BUF}$ to be input to a logic circuit connected thereto.

The resistor or resistive load 164 can be implemented by any suitable means such as n-type or a p-type transistor. In another embodiment, the resistive load may comprise a device that can be implemented as a resistor such as a bipolar device, a length of poly (e.g. poly silicon) or any other device.

Referring to the embodiment shown in FIG. 9, the main difference between this embodiment and that shown in FIG. 8 is that the first inverter 151 has been removed from the carry propagate circuit, in which the case output of the carry propagate circuit is $\overline{C}_{OUT}$.

Any of the full adder circuits disclosed herein may be used to implement a full adder of any size.

In other embodiments, the various transistors used to implement the full adder circuit (or other circuit), may be of any other suitable type, for example bipolar. NMOS and PMOS FETS disclosed herein are illustrative examples only and any FET of either type disclosed herein may be replaced by any other type, as desired. Furthermore, any references herein to a source of an FET may be replaced by a reference to a drain, and vice versa.

The principles of reducing the capacitive loading and load sharing provided by various aspects of the present invention may be applied to other circuits for increasing the speed of transmitting a (digital) signal.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An electronic circuit comprising:
   a logic gate having at least two binary inputs adapted to receive corresponding input binary digits;
   an input for receiving the at least two binary inputs;
   an output for outputting a carry out signal and a sum signal;
   a carry signal propagator coupled between said input and said output for determining said carry-out signal and said carry signal propagator including a first inverter for inverting a carry in signal;
   a logic circuit coupled to said carry signal propagator and having an input capacitance, said logic circuit including a summing circuit to calculate said sum signal;
   a capacitance decoupler coupled between said logic circuit and said carry signal propagator for decoupling said input capacitance of said logic circuit from said carry signal propagator, and for reducing said input capacitance of said carry signal propagator and providing carry signals using said carry in signal to said logic circuit to calculate said sum signal, wherein said capacitance decoupler comprises a second inverter having a first and second field effect transistor (FET) having a gate, a source, and a drain and a third inverter having a third and fourth FET having a gate, a source, and a drain;
   wherein an input of said first inverter is connected to said gate of said first FET, an output of said first inverter is connected to said gate of said third FET, an output of said second inverter is connected to said gate of said fourth FET, and an output of said third inverter is connected to said gate of said second FET, and said outputs of said second and third inverters also connected to said logic circuit to calculate said sum signal; and
   wherein said capacitance decoupler causes a capacitive loading of said carry signal propagator to be shared evenly between said second and third inverters, and an overall capacitance on said carry signal propagator is reduced.

2. An electronic circuit as claimed in claim 1, wherein said FET comprises an NMOS or PMOS type FET.

3. An electronic circuit as claimed in claim 1, wherein a logic circuit coupled to said carry signal propagator requires both an inverted signal and a non-inverted signal and inputs of said logic circuit for said inverted and non-inverted signals are connected to inverted and non-inverted signal outputs of said capacitance decoupler.

4. An electronic circuit as claimed in claim 1, wherein an input of said carry signal propagator comprises a first input and a second input, an output of said carry signal propagator comprises a first output and a second output, and said carry signal propagator comprises a first carry propagator coupled to said first input and a second carry propagator coupled to said second input, and said capacitance decoupler is connected to at least one of said first carry propagator and said second carry propagator.

5. An electronic circuit as claimed in claim 4, wherein said logic circuit is coupled to said first and said second carry propagators.

6. An electronic circuit as claimed in claim 4, wherein said capacitance decoupler is adapted to decouple said first and said second carry propagators from said input capacitance of said logic circuit.

7. An electronic circuit as claimed in claim 4, further comprising:
   a generator for generating the carry signals including an inverted carry signal and a non-inverted carry signal, and coupled between at least one of said first and second carry propagators and said logic circuit.

8. An electronic circuit as claimed in claim 4, further comprising a device for transmitting a signal to said first input of said first carry propagator and a device for transmitting an inversion of said signal to said second input of said second carry propagator, and wherein said capacitance decoupler comprises a first output for outputting an inverted signal to said logic circuit and a second output for outputting a non-inverted signal to said logic circuit.

9. An electronic circuit as claimed in claim 4, further comprising:
   a device for outputting the generated carry signals from said first carry propagator and coupled between said first carry propagator and said first output.

10. An electronic circuit as claimed in claim 9, wherein said device for outputting the generated carry signals comprises a first and second field effect transistors each having a gate, a source and a drain, said drain of said first transistor being connected to a source of said second transistor and to said first output, said first carry propagator being connected to a gate of said first transistor, and a device for applying a potential difference between a source of said first transistor and a drain of said second transistor.

11. An electronic circuit as claimed in claim 1, wherein said summing circuit includes an XOR gate.

12. An electronic circuit as claimed in claim 1, wherein said carry signal propagator comprises a carry propagator for determining the carry-out signal from the carry-in signal.

13. An electronic circuit as claimed in claim 1, wherein said electronic circuit is incorporated in a full adder circuit.

14. A circuit comprising a plurality of electronic circuits, each electronic circuit being as claimed in claim 1, wherein an output of an electronic circuit is coupled to an input of an adjacent electronic circuit.

15. An electronic circuit comprising:
first and second signal generators, each having an input and an output, the input for receiving at least two binary inputs and the output for outputting a carry-out signal and a sum signal;
a circuit device coupled between an output of said first signal generator and an input of said second signal generator for determining said carry-out signal and said circuit device including a first inverter for inverting a carry in signal;
a logic circuit coupled to an input of said first signal generator and having an input capacitance, said logic circuit including a summing circuit to calculate said sum signal;
a capacitance decoupler coupled between said logic circuit and said circuit device for decoupling said input capacitance of said logic circuit from said circuit device, and for reducing said input capacitance of said circuit device and providing carry signals using said carry in signal to said logic circuit to calculate said sum signal, wherein said capacitance decoupler comprises a second inverter having a first and second field effect transistor (FET) having a gate, a source, and a drain and a third inverter having a third and fourth FET having a gate, a source, and a drain;
wherein an input of said first inverter is connected to said gate of said first FET, an output of said first inverter is connected to said gate of said third FET, an output of said second inverter is connected to said gate of said fourth FET, and an output of said third inverter is connected to said gate of said second FET, and said outputs of said second and third inverters also connected to said logic circuit to calculate said sum signal; and
wherein said capacitance decoupler causes a capacitive loading of said circuit device to be shared evenly between said second and third inverters, and an overall capacitance on said circuit device is reduced.

16. An electronic circuit as claimed in claim 15, wherein at least one of said first and second signal generators comprises an inverter.

17. An electronic circuit as claimed in claim 15, wherein said circuit device is adapted to operate on a signal output from said first generator.

18. An electronic circuit as claimed in claim 17, wherein said circuit device is adapted to process the carry-in signal for determining the carry-out signal.

19. An electronic circuit as claimed in claim 15, wherein said summing circuit includes a XOR gate.

20. An electronic circuit as claimed in claim 15, wherein said electronic circuit is incorporated in an adder circuit.

21. A circuit comprising a plurality of electronic circuits, each electronic circuit being as claimed in claim 15, wherein an output of said second generator of an electronic circuit is connected to an input of said first signal generator of an adjacent electronic circuit.

22. An electronic circuit comprising:
First, second, third, and fourth inputs and first, second, and third outputs, wherein the first and second inputs receive a carry in signal and an inverted carry in signal, the third and fourth inputs receive at least two binary inputs, and the first, second, and third outputs output a carry-out signal, an inverted carry-out signal, and a sum signal;
a first carry propagator coupled between said first input and said second output and a second carry propagator coupled between said second input and said first output, the first and second carry propagators for determining said carry-out signal and said inverted carry out signal;
a circuit having first and second inputs coupled to inputs of said first and second carry propagators and having an input capacitance, said circuit including a summing circuit to calculate said sum signal;
a first decoupler coupled between said first and second inputs of said circuit and said inputs of said first and second carry propagators for decoupling said input capacitance of said circuit from said first and second carry propagators, and for reducing said input capacitance of said first and second carry propagators and providing carry signals using said carry in and inverted carry in signals to said circuit to calculate said sum signal, wherein said decoupler comprises a first inverter having a first and second field effect transistor (FET) having a gate, a source, and a drain and a second inverter having a third and fourth FET having a gate, a source, and a drain;
a second decoupler coupled between said first and second outputs and said outputs of said first and second carry propagators for decoupling a capacitance of said first and second carry propagators from said first and second outputs, and for reducing said capacitance of said first and second carry propagators and providing carry signals using said carry in and inverted carry in signals to said first and second outputs, wherein said decoupler comprises a third inverter having a fifth and sixth field effect transistor (FET) having a gate, a source, and a drain and a fourth inverter having a seventh and eighth FET having a gate, a source, and a drain;
wherein an input of said first carry propagator is connected to said gate of said third FET, an input of said second carry propagator is connected to said gate of said first FET, an output of said second inverter is connected to said gate of said second FET, and an output of said first inverter is connected to said gate of said fourth FET, and said outputs of said second and third inverters also connected to said circuit to calculate said sum signal;
wherein an output of said first carry propagator is connected to said gate of said seventh FET, an output of said second carry propagator is connected to said gate of said fifth FET, an output of said third inverter is connected to said gate of said eighth FET, and an output of said fourth inverter is connected to said gate of said sixth FET, and said outputs of said third and fourth inverters also connected to said carry-out and inverted carry-out signals; and
wherein said capacitance decouplers cause a capacitive loading of said carry propagators to be shared evenly between said inverters, and an overall capacitance on said carry propagator is reduced.

23. An electronic circuit as claimed in claim 22, wherein said first input of said circuit is coupled to the input of said first carry propagator and said second input of said circuit is coupled to the input of said second carry propagator.

24. An electronic circuit as claimed in claim 22, wherein said first carry propagator comprises a circuit device for operating on a signal received at said input of said first carry propagator.

25. An electronic circuit as claimed in claim 24, wherein said circuit device comprises a carry propagate circuit adapted for determining the carry-out signal from the carry-in signal at said input of said first carry propagator.

26. An electronic circuit as claimed in claim 22, wherein said second carry propagator comprises a circuit device for operating on a signal received at said input of said second carry propagator.

27. An electronic circuit as claimed in claim 26, wherein said circuit device comprises a carry propagate circuit for determining the carry-out signal from the carry-in signal at said input of said second carry propagator.

28. An electronic circuit as claimed in claim 22, wherein said input of said second carry propagator is adapted to receive an inverted version of a signal received at said input of said first carry propagator.

29. An electronic circuit as claimed in claim 22, wherein the FET in each of said first and second decouplers comprise an NMOS FET.

30. An electronic circuit as claimed in claim 29, wherein the FET in each of said first and second decouplers further comprises a PMOS FET in which one of a drain and a source of said PMOS FET is coupled to one of a source and a drain of said NMOS FET.

31. An electronic circuit as claimed in claim 22, further comprising an inverter coupled at an output of said first carry propagator.

32. An electronic circuit as claimed in claim 22, further comprising an inverter coupled at an output of said second carry propagator.

33. An electronic circuit as claimed in claim 31, wherein said inverter comprises an N-type transistor and a P-type transistor and said first carry propagator is coupled to said control input of said N-type transistor.

34. An electronic circuit as claimed in claim 31, wherein said inverter comprises a differential buffer.

35. An electronic circuit comprising:
a first logic gate having at least two inputs to receive corresponding first and second input binary digits and at least two outputs for outputting a first carry out signal and a first sum signal;
a second logic gate having at least two inputs to receive corresponding third and fourth input binary digits and at least two outputs for outputting a second carry out signal and a second sum signal;
a first carry signal propagator coupled between said first input and said first output for determining said first carry-out signal and said first carry signal propagator including a first inverter for inverting a first carry in signal;
a second carry signal propagator coupled between said second input and said second output for determining said second carry-out signal and said second carry signal propagator including a second inverter for inverting a second carry in signal, wherein the second carry-in signal is the first carry out signal;
a first logic circuit coupled to said first carry signal propagator and having a first input capacitance, said first logic circuit including a first summing circuit to calculate said first sum signal;
a second logic circuit coupled to said second carry signal propagator and having a second input capacitance, said second logic circuit including a second summing circuit to calculate said second sum signal;
a first capacitance decoupler coupled between said first logic circuit and said first carry signal propagator for decoupling said first input capacitance of first said logic circuit from said first carry signal propagator, and for reducing said first input capacitance of said first carry signal propagator and providing first carry signals using said first carry in signal to said first logic circuit to calculate said first sum signal, wherein said first capacitance decoupler comprises a third inverter having a first and second field effect transistor (FET) having a gate, a source, and a drain and a fourth inverter having a third and fourth FET having a gate, a source, and a drain;
wherein an input of said first inverter is connected to said gate of said first FET, an output of said first inverter is connected to said gate of said third FET, an output of said third inverter is connected to said gate of said fourth FET, and an output of said fourth inverter is connected to said gate of said second FET, and said outputs of said third and fourth inverters also connected to said first logic circuit to calculate said first sum signal;
wherein said first capacitance decoupler causes a capacitive loading of said first carry signal propagator to be shared evenly between said third and fourth inverters, and an overall capacitance on said first carry signal propagator is reduced;
a second capacitance decoupler coupled between said second logic circuit and said second carry signal propagator for decoupling said second input capacitance of second said logic circuit from said second carry signal propagator, and for reducing said second input capacitance of said second carry signal propagator and providing second carry signals using said second carry in signal to said second logic circuit to calculate said second sum signal, wherein said second capacitance decoupler comprises a fifth inverter having a fifth and sixth field effect transistor (FET) having a gate, a source, and a drain and a sixth inverter having a seventh and eighth FET having a gate, a source, and a drain;
wherein an input of said second inverter is connected to said gate of said fifth FET, an output of said second inverter is connected to said gate of said seventh FET, an output of said fifth inverter is connected to said gate of said eighth FET, and an output of said sixth inverter is connected to said gate of said sixth FET, and said outputs of said fifth and sixth inverters also connected to said second logic circuit to calculate said second sum signal; and
wherein said second capacitance decoupler causes a capacitive loading of said second carry signal propagator to be shared evenly between said fifth and sixth inverters, and an overall capacitance on said second carry signal propagator is reduced.

* * * * *